United States Patent
Vickers et al.

(10) Patent No.: US 10,901,576 B1
(45) Date of Patent: Jan. 26, 2021

(54) COLOR SELECTION AND DISPLAY

(71) Applicant: The Sherwin-Williams Company, Cleveland, OH (US)

(72) Inventors: Meghan L Vickers, Willoughby, OH (US); Pamela A Gillikin, Newbury, OH (US); Lori A Domanick, Sagamore Hills, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 15/800,175

(22) Filed: Nov. 1, 2017

Related U.S. Application Data

(60) Provisional application No. 62/415,613, filed on Nov. 1, 2016.

(51) Int. Cl.
*G06F 3/00* (2006.01)
*G06F 3/0482* (2013.01)
(Continued)

(52) U.S. Cl.
CPC .......... *G06F 3/0482* (2013.01); *G06F 3/0488* (2013.01); *G06F 3/04817* (2013.01);
(Continued)

(58) Field of Classification Search
CPC .. G06F 3/0482; G06F 3/04842; G06F 3/0488; G06F 3/04845; G06F 3/04817;
(Continued)

(56) References Cited

U.S. PATENT DOCUMENTS

| | | | |
|---|---|---|---|
| 5,844,542 | A | 12/1998 | Inoue et al. |
| 6,502,049 | B1 | 12/2002 | Takada et al. |
| | | (Continued) | |

FOREIGN PATENT DOCUMENTS

| | | |
|---|---|---|
| CN | 2340001 | 9/1999 |
| EP | 1359399 | 5/2003 |
| | (Continued) | |

OTHER PUBLICATIONS

Application and File History for U.S. Appl. No. 16/181,730, filed Nov. 6, 2018, inventors Vickers et al.
(Continued)

*Primary Examiner* — Anil N Kumar
(74) *Attorney, Agent, or Firm* — Patterson Thuente Pedersen, P.A.

(57) ABSTRACT

A color selection and display device includes a display, a user interface configured for receiving input data identifying a selected color, an orientation sensor configured to generate an orientation signal based on an orientation of the color selection and display device, and a memory storing a virtual paint chip arrangement. Relative locations of individual colors within the virtual paint chip arrangement correspond to a real world retail paint chip display. The device further includes at least one processor configured to receive the orientation signal and determine an orientation of the color selection and display device, and to control the display to automatically display the virtual paint chip arrangement based on the orientation of the color selection and display device. The selected color is highlighted in the virtual paint chip arrangement.

26 Claims, 9 Drawing Sheets

(51) Int. Cl.
  *G06F 3/0484* (2013.01)
  *G06F 3/0481* (2013.01)
  *G09G 5/02* (2006.01)
  *G09G 5/04* (2006.01)
  *G06F 3/0488* (2013.01)
  *G06Q 30/06* (2012.01)

(52) U.S. Cl.
  CPC ...... *G06F 3/04842* (2013.01); *G06F 3/04845* (2013.01); *G09G 5/022* (2013.01); *G09G 5/04* (2013.01); *G06Q 30/0623* (2013.01); *G06Q 30/0643* (2013.01)

(58) Field of Classification Search
  CPC ............ G06Q 30/0623; G06Q 30/0643; G09G 5/022; G09G 5/04
  See application file for complete search history.

(56) References Cited

U.S. PATENT DOCUMENTS

| | | | |
|---|---|---|---|
| 6,556,303 | B1 | 4/2003 | Rangarajan et al. |
| 6,641,696 | B1 | 11/2003 | Edgerton |
| 6,744,513 | B2 | 6/2004 | Kubo et al. |
| 7,042,566 | B2 | 5/2006 | Skierski et al. |
| 7,116,420 | B2 | 10/2006 | Skierski et al. |
| 7,180,524 | B1 | 2/2007 | Axelrod |
| 7,230,707 | B2 | 6/2007 | Ingleson et al. |
| 7,430,316 | B2 | 9/2008 | Boston et al. |
| 7,796,296 | B2 | 9/2010 | Martinez et al. |
| 7,935,274 | B2 | 5/2011 | Sara et al. |
| 7,999,825 | B2 | 8/2011 | Liang-Shang |
| 8,244,032 | B2 | 8/2012 | Sara et al. |
| 8,319,788 | B2 | 11/2012 | Buzyn et al. |
| 8,517,267 | B2 | 8/2013 | Ishiuka et al. |
| 8,752,762 | B2 | 6/2014 | Reynolds et al. |
| 9,152,311 | B2 | 10/2015 | Buzyn et al. |
| 9,530,163 | B2 | 12/2016 | Buzyn et al. |
| 9,563,342 | B2 | 2/2017 | Reynolds et al. |
| 9,619,052 | B2 * | 4/2017 | Bernstein ............ G06F 3/03545 |
| 9,639,983 | B2 | 5/2017 | Buzyn et al. |
| 9,857,888 | B2 | 1/2018 | Reynolds et al. |
| 9,971,487 | B2 | 5/2018 | Buzyn et al. |
| 2003/0151611 | A1 | 8/2003 | Turpin et al. |
| 2004/0093112 | A1 | 5/2004 | Marchand et al. |
| 2004/0131756 | A1 | 7/2004 | Skierski et al. |
| 2004/0223149 | A1 | 11/2004 | Skierski et al. |
| 2005/0219561 | A1 | 10/2005 | Haikin |
| 2006/0210153 | A1 | 9/2006 | Sara et al. |
| 2008/0218814 | A1 | 9/2008 | Ferlitsch |
| 2009/0231356 | A1 | 9/2009 | Barnes et al. |
| 2011/0210978 | A1 | 9/2011 | Sara et al. |
| 2012/0019572 | A1 | 1/2012 | Lim |
| 2012/0138168 | A1 | 6/2012 | Richter |
| 2012/0217360 | A1 | 8/2012 | Fanning, Jr. et al. |
| 2013/0268871 | A1 | 10/2013 | Webb et al. |
| 2015/0178955 | A1 * | 6/2015 | Topakas ............ G06F 17/30247 345/589 |
| 2015/0235389 | A1 * | 8/2015 | Miller ................ G06Q 30/0643 345/594 |
| 2015/0268098 | A1 * | 9/2015 | Minchew ................ G01J 3/526 345/594 |
| 2016/0275702 | A1 * | 9/2016 | Reynolds ............ G06F 3/04817 |
| 2018/0074605 | A1 | 3/2018 | Reynolds et al. |
| 2019/0066338 | A1 | 2/2019 | Perlman et al. |
| 2019/0138168 | A1 | 5/2019 | Vickers et al. |
| 2019/0301941 | A1 | 10/2019 | Kawabata et al. |

FOREIGN PATENT DOCUMENTS

| | | |
|---|---|---|
| FR | 2698982 | 6/1994 |
| JP | 11269411 | 10/1999 |

OTHER PUBLICATIONS

Lebow et al., "Classification of Wood Surface Features by Spectral Reflectance", Jan. 1996. Wood and Fiber Science, vol. 28(1), 1996., pp. 74-90.
"Blue Stain", U.S. Department of Agriculture, Forest Service, Forest Products Laboratory, 2 pages, (May 2002).
International Search Report for PCT/US2006/009845 dated Jul. 27, 2006.

* cited by examiner

COLOR SELECTION AND DISPLAY

This application claims the benefit of U.S. provisional application No. 62/415,613 filed on Nov. 1, 2016, the entirety of which is hereby incorporated by reference.

BACKGROUND OF THE INVENTION

Field of the Invention

Embodiments of the present invention relate to devices and methods for selecting colors, for example paint colors, and displaying the selected colors to a user along with additional information about the selected colors.

Description of Related Art

In retail paint sales, it is conventional to display the various colors available for purchase using "paint chips." The paint chips are cards that have a sample or swatch of one or more of the colors that are available for purchase. The paint chips also include identifying indicia for the paint color, such as a trademark or name for the paint color, the manufacturer's name, a product number, a barcode, etc.

Paint chips are typically displayed in a retail store in an ordered arrangement upon a display (i.e., a paint chip display). The paint chip display has racks for holding numerous paint chips for inspection by a customer. Individual paint chips within the display may be organized by color; for example, shades of blue are grouped together, shades of red are grouped together, etc. The paint chip display might include hundreds or thousands of unique colors of paint available for purchase. If a customer is aware of a specific color of paint and would like to inspect the paint chip for that specific color, but does not know the location of the specific color within the paint chip display, it can be challenging for the customer to find the correct paint chip due to the large number of paint chips available for selection.

BRIEF SUMMARY OF THE INVENTION

The following summary presents a simplified summary in order to provide a basic understanding of some aspects of the devices and methods discussed herein. This summary is not an extensive overview of the devices and methods discussed herein. It is not intended to identify critical elements or to delineate the scope of such devices and methods. Its sole purpose is to present some concepts in a simplified form as a prelude to the more detailed description that is presented later.

In accordance with one aspect of the present disclosure, provided is a color selection and display device. The color selection and display device includes a display, a user interface configured for receiving input data identifying a selected color, an orientation sensor configured to generate an orientation signal based on an orientation of the color selection and display device, and a memory storing a virtual paint chip arrangement. Relative locations of individual colors within the virtual paint chip arrangement correspond to a real world retail paint chip display. The device further includes at least one processor configured to receive the orientation signal and determine an orientation of the color selection and display device, and to control the display to automatically display the virtual paint chip arrangement based on the orientation of the color selection and display device. The selected color is highlighted in the display of the virtual paint chip arrangement.

In accordance with another aspect of the present disclosure, provided is a color selection and display method. A first image is displayed on a display of a handheld data processing device. At least one processor of the handheld data processing device obtains data identifying a selected color. The at least one processor receives an orientation signal from an orientation sensor within the handheld data processing device. Based on a current orientation of the handheld data processing device, the first image is automatically replaced with a second image that includes a virtual paint chip arrangement corresponding to a real world retail paint chip display. The selected color is highlighted in the virtual paint chip arrangement that is displayed by the device.

In accordance with another aspect of the present disclosure, provided is a computer program product for displaying a location of a selected color within a virtual paint chip arrangement. The virtual paint chip arrangement corresponds to a real world retail paint chip display. The computer program product comprises a plurality of instructions stored on a non-transitory computer-readable storage medium. The instructions are executable by a processor in a device to allow said device to display a first image, obtain data identifying a selected color, receive an input from a user, and replace the first image with a second image that includes the virtual paint chip arrangement based on the input from the user. The selected color is highlighted in the virtual paint chip arrangement.

In accordance with another aspect of the present disclosure, provided is a color selection and display device. The color selection and display device includes a display and a user interface configured for receiving input data identifying a selected color. A memory stores a virtual paint chip arrangement. Relative locations of individual colors within the virtual paint chip arrangement correspond to a real world retail paint chip display. The device further includes at least one processor configured to control the display to display the virtual paint chip arrangement such that the selected color is highlighted in the virtual paint chip arrangement.

DETAILED DESCRIPTION OF THE INVENTION

Figure 1:
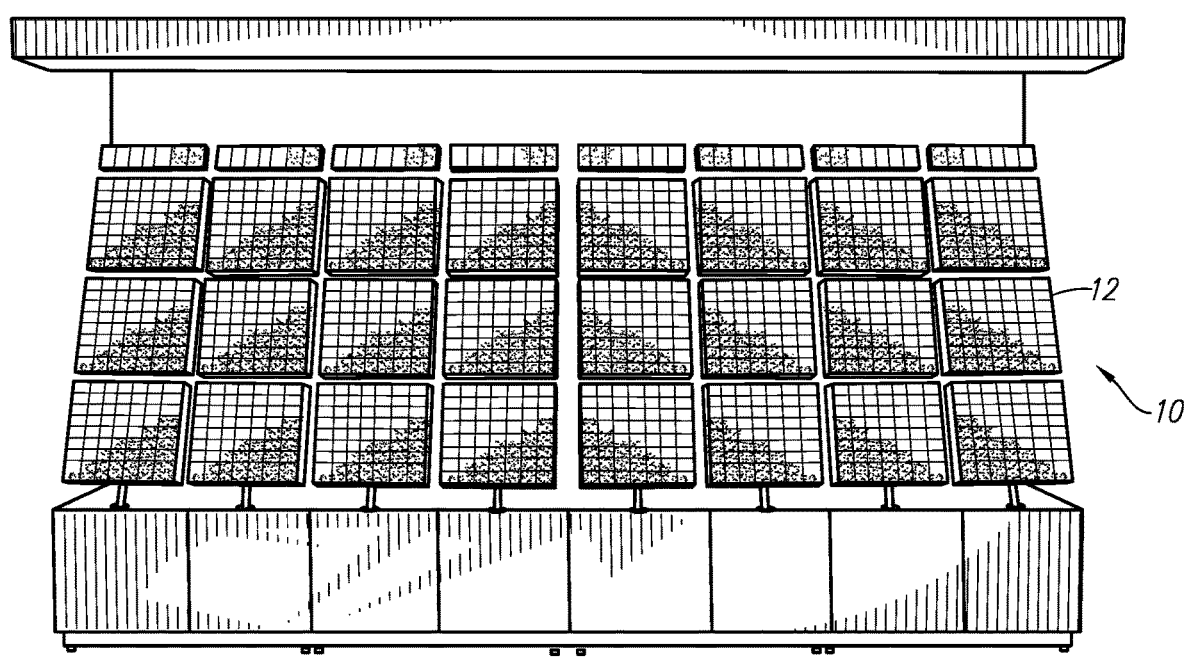
FIG. 1 shows a perspective view of a paint chip display.

Embodiments of the present invention relate to devices and methods for selecting colors, such as paint colors, and displaying the selected colors and additional information about the selected colors. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

FIG. 1 shows an example paint chip display 10 as may be found in a retail store. The paint chip display 10 includes a plurality of different paint chips 12 showing the various colors or hues of paint that are available for purchase and their respective identifying indicia (name, product number, etc.) Due to the large number of different paint chips 12 in the paint chip display 10, it can be difficult for a customer to find a particular desired paint chip within the display, unless he or she is already aware of the location of the paint chip. The embodiments discussed herein can, among other things, help a customer to locate desired paint chips within the paint chip display 10. The color selection and display device of the present disclosure is configurable for use with any type of paint chip display, and therefore not limited to use with the display 10.

Figure 2:
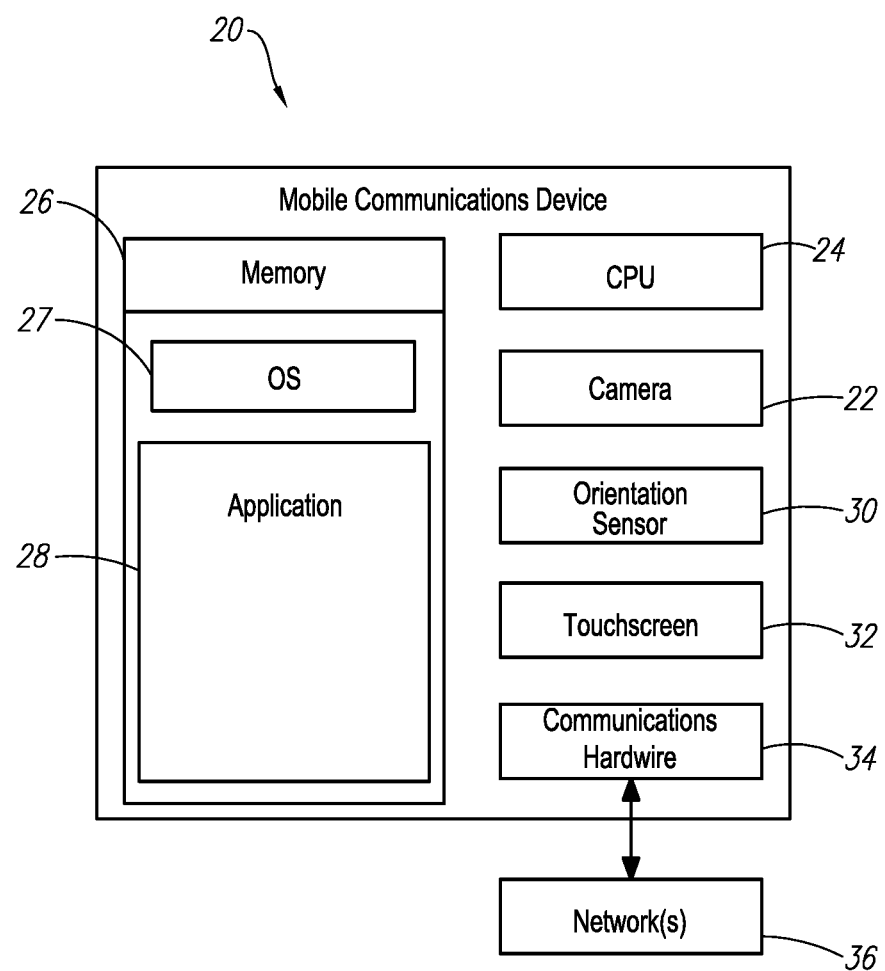
FIG. 2 is a block diagram of an example mobile communications device.

FIG. 2 is a block diagram of an example data processing device for executing a color selection program or application discussed herein. The data processing device can be a handheld device, such as a tablet or notebook computer, mobile communications device (e.g., smartphone), etc. In FIG. 2, and elsewhere within this disclosure, the data processing device is discussed in the context of a smartphone 20 for ease of explanation, although it is understood that any other suitably configured and programmed device such as a tablet of laptop computer or notebook computer can be used in place of a smartphone, and all references herein to smartphone 20 also include such alternate devices.

The smartphone 20 includes a display 21 and an image capturing device 22 (e.g. camera) electronically connected to at least one processor 24. The image capturing device 22 can be used to capture color images or images having identifying indicia for paint colors (e.g., from paint chips) as discussed below. The processor 24 is communicatively coupled to a memory 26 storing computer executable instructions that are readable and executable by the processor 24. The instructions can include an operating system 27 for the smartphone 20 and a color selection application 28 that provides the functionality described herein. However, it is to be appreciated that some or all of the instructions or associated data can be stored remotely from the smartphone 20 for access over a network 36 if desired, and that the instructions and associated data need not be stored locally within the memory 26.

The smartphone 20 includes one or more orientation sensors 30 (e.g., accelerometers). The orientation sensors 30 sense the physical orientation of the smartphone 20 (e.g., vertical, horizontal, etc.) and generate a corresponding orientation signal that is provided to the processor 24. The processor 24 can determine the current physical orientation of the smartphone 20 from the orientation signal(s) and respond accordingly, such as by adjusting a displayed image based on the current orientation of the device.

The smartphone 20 includes a user interface, which may include multiple devices, such as for example display 21 and associated controls which provide the interface between the user and the smartphone. For example, the smartphone 20 can include a touchscreen interface 32 having a display, various interface buttons (e.g., a power button, a selection button; etc.), speakers, microphones, and other input or output devices. The camera 22 can also be considered part of the user interface for the smartphone 20 as it is used to enter selected images into the smartphone. The smartphone 20 further includes communications hardware 34 for communications over a network 36. Example communications include both wired and wireless communications, such as wi-fi communications, communications via a cellular telephone system, BLUETOOTH communications, nearfield communications, etc.

Figure 3:
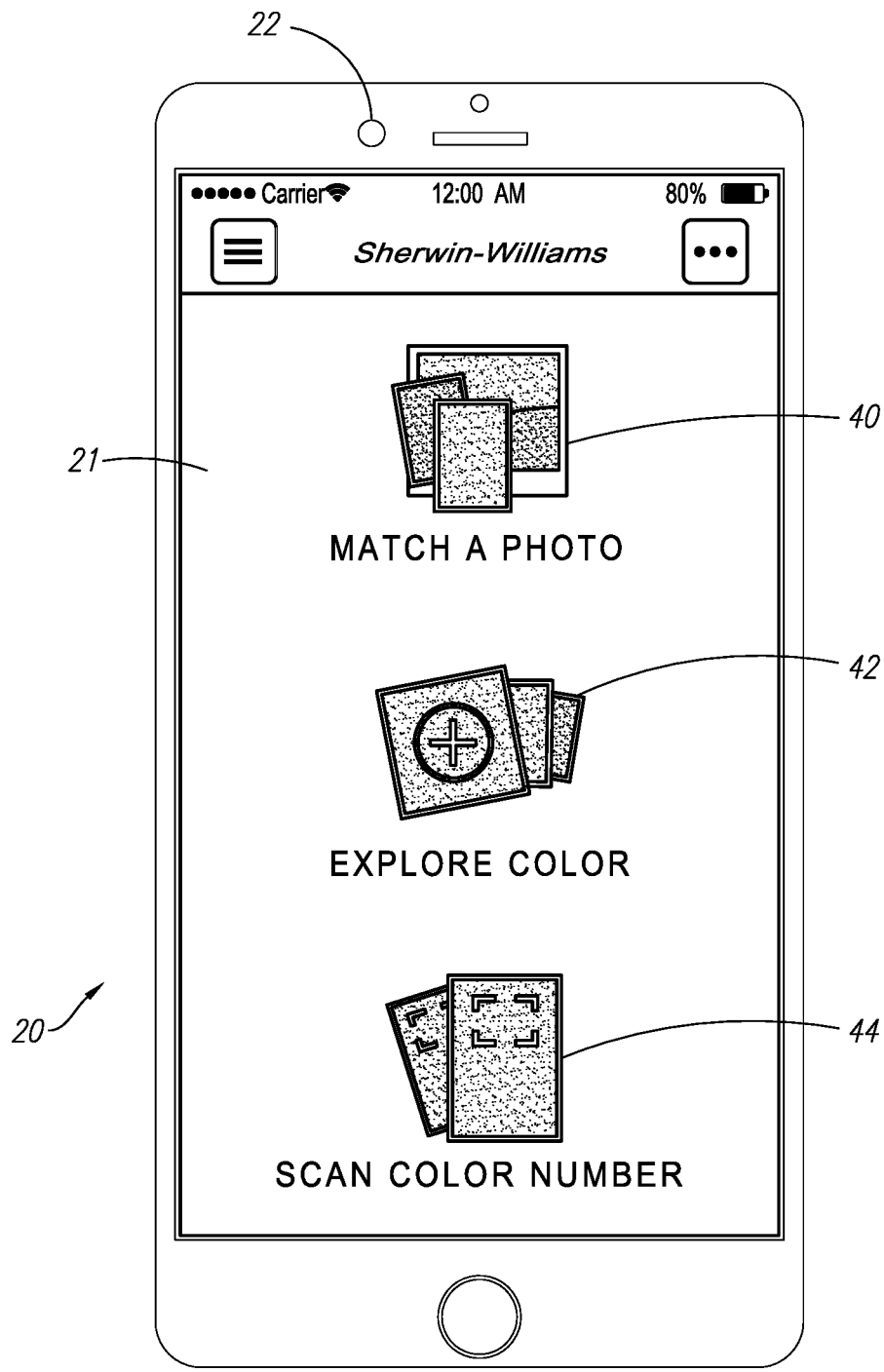
FIG. 3 shows an example mobile communications device.

FIGS. 3-8 show interface screen displays 21 by the smartphone 20 when executing a color selection application. FIG. 3 is an initial screen that provides a user with different options for selecting a color. Touching the "match a photo" icon 40 can allow the user to choose a desired color found within an existing photo or from a new photo taken for the purpose of capturing and matching a desired color. Colors within a photo can be matched to predefined colors available for purchase using color matching algorithms. Touching the "explore color" icon 42 can allow the user to select a desired color from an array of predefined colors available for purchase. Touching the "scan color number" icon 44 can initiate a subprogram in which a code, such as a color number, is captured and read by the smartphone 20.

Figure 4:
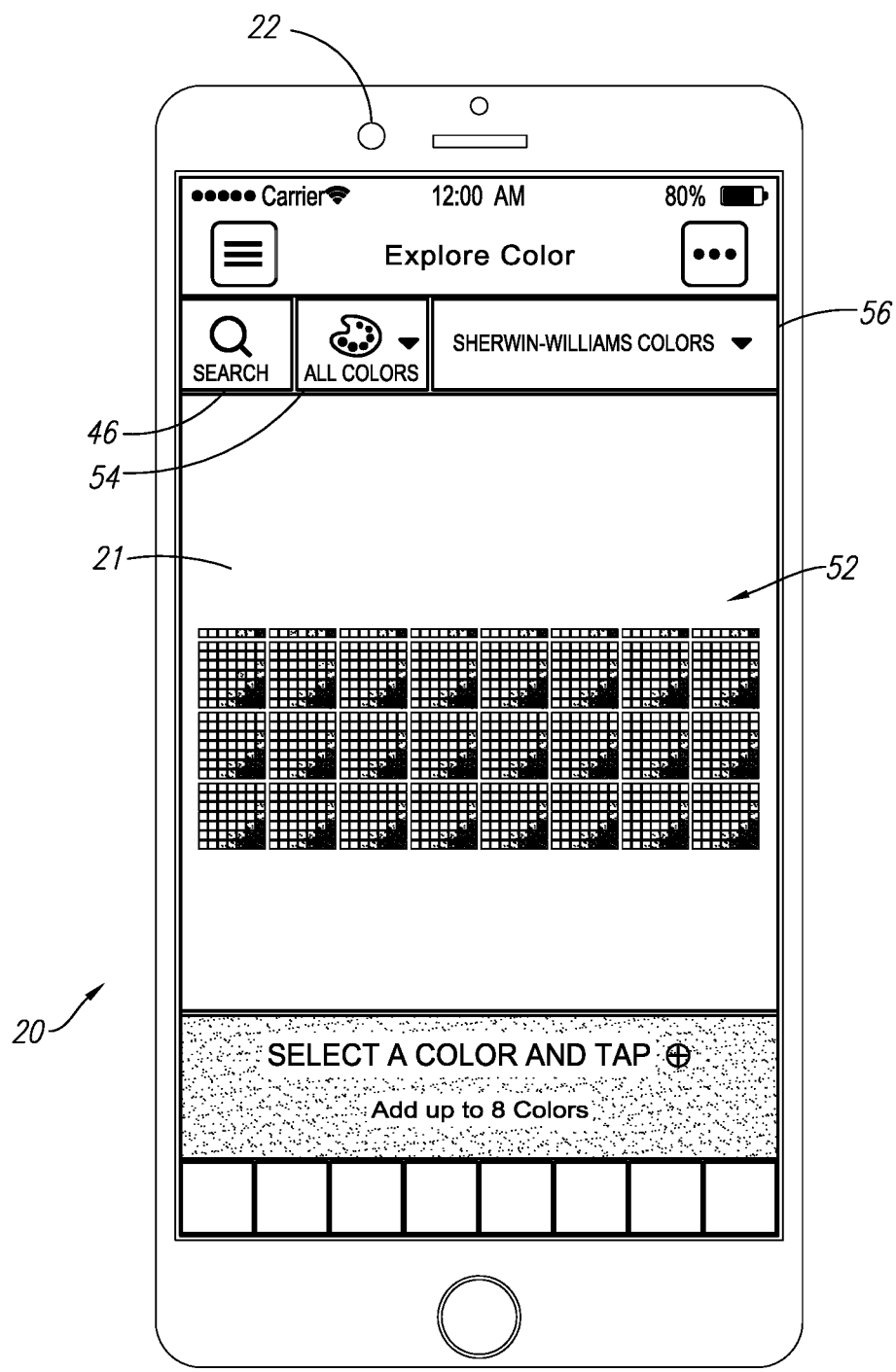
FIG. 4 shows an example mobile communications device.
Figure 5:
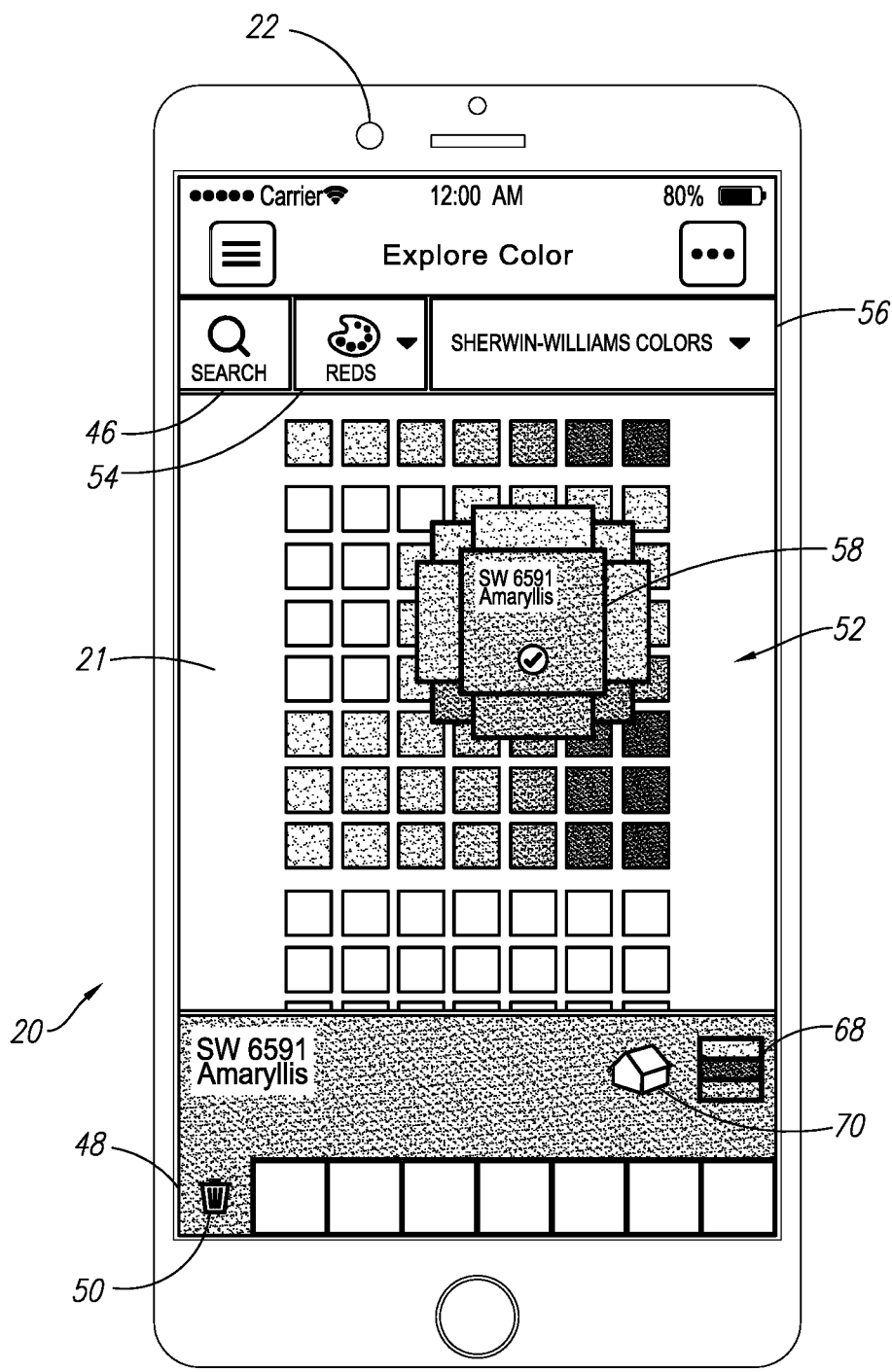
FIG. 5 shows an example mobile communications device.

FIGS. 4 and 5 show example interface screens that can be displayed when the "explore color" icon 42 (FIG. 3) is touched. The interface screen in FIG. 4 shows an array 52 of different colors that are available for selection by the user, but prior to any color selection being made. The interface screen in FIG. 5 shows a portion of the array of different colors 52 after a color selection has been made, and a selected color 58 is highlighted within the array. Relative locations of the individual colors within the array 52 can match the locations of the colors in a real world retail paint chip display, or portions of a real world retail paint chip display. Thus, the array 52 could be substantially similar to the virtual paint chip arrangement discussed below. However, the relative locations of the individual colors within the array 52 need not correspond to a real world retail paint chip display and could be arranged in any manner, such as according to type of paint, intended application (indoor, outdoor, etc.), price, color collections etc.

Paint colors available for purchase can be identified by a name and a code, such as a color number, bar code, etc. Paint colors within the color selection application can be chosen by name or color number. Touching the search button 46 can activate an entry field (e.g., a text entry box) that allows the user to enter a particular color name or number. If the color name or number matches one of the predefined colors available for purchase, that color will be selected and can be displayed or highlighted as shown in FIG. 5. A selected color is added to a user's palette of selected colors (virtual color palette). The virtual color palette 48 is shown in a representative form at the bottom of the interface screen in FIG. 5. It can be seen that a number of colors (e.g., eight different colors, more than eight different colors, fewer than eight different colors, etc.) can be added to the virtual color palette 48. Colors can be deleted (deselected) from the virtual color palette 48 by touching a "trash" icon 50 on the virtual color palette.

The major portion of the interface screens in FIGS. 4 and 5 display an array 52 of different colors that are available for selection by the user, for addition to the virtual color palette 48. A first drop-down menu button 54 is displayed that allows the user to choose from among specific shades of color, such as reds for example. Selecting "reds" from the drop down menu (not shown) will cause red shades to be displayed within the array 52. A second drop-down menu button 56 provides for the selection of colors within other arbitrary groups. For example, colors can be grouped based on color collections provided by a retailer (e.g., historic colors, timeless colors, spring colors, school or other institution colors, sports team colors, etc.) Selection of a color group will display an array 52 of colors within the group.

Within the array 52, the individual color icons are small and no identifying information is provided beyond the visual appearance of the shade of color. However, once a color is selected from the array 52 by touching the selected color icon, the selected color is highlighted in the array. For example, the respective size of the color icon 58 is increased, as illustrated with the color SW6591 Amaryllis, and superposed in a geometric arrangement with adjacent colors in the array. Also, identifying indicia, such as the color name and number, can be displayed in the color icon and also within the virtual color palette 48. Colors immediately adjacent to the selected color 58 in the array 52 can also be highlighted (e.g., by increasing their icon size relative to the other colors in the array). For example, in FIG. 5, the color icon 58 of the selected color is shown on top of eight adjacent colors that surround the selected color within the array 52. The color icons of the selected color and adjacent colors are highlighted by increasing their size, and the selected color is displayed on top. If the selected color is located at an edge of the array 52, then fewer than eight adjacent colors will be highlighted.

After one or more colors are selected and added to the virtual color palette 48, a user may wish to access paint chips for the selected colors from a real world retail paint chip display 10 (FIG. 1). To help the user find or locate the selected colors in the real world retail paint chip display, memory in the smartphone 20 or a remote memory accessible to the smartphone can store a virtual paint chip arrangement. Relative locations of the individual colors within the virtual paint chip arrangement match the locations of the colors in the real world retail paint chip display. Via an input on the smartphone 20, the user can signal the smartphone to "locate" the selected colors in the virtual paint chip arrangement. The virtual paint chip arrangement will then be displayed with the selected colors highlighted in the virtual paint chip arrangement. By comparing the virtual paint chip arrangement, in which the selected colors are highlighted, to the real world retail paint chip display, the user can quickly find the paint chips corresponding to the selected colors in the real world retail paint chip display.

Figure 6:
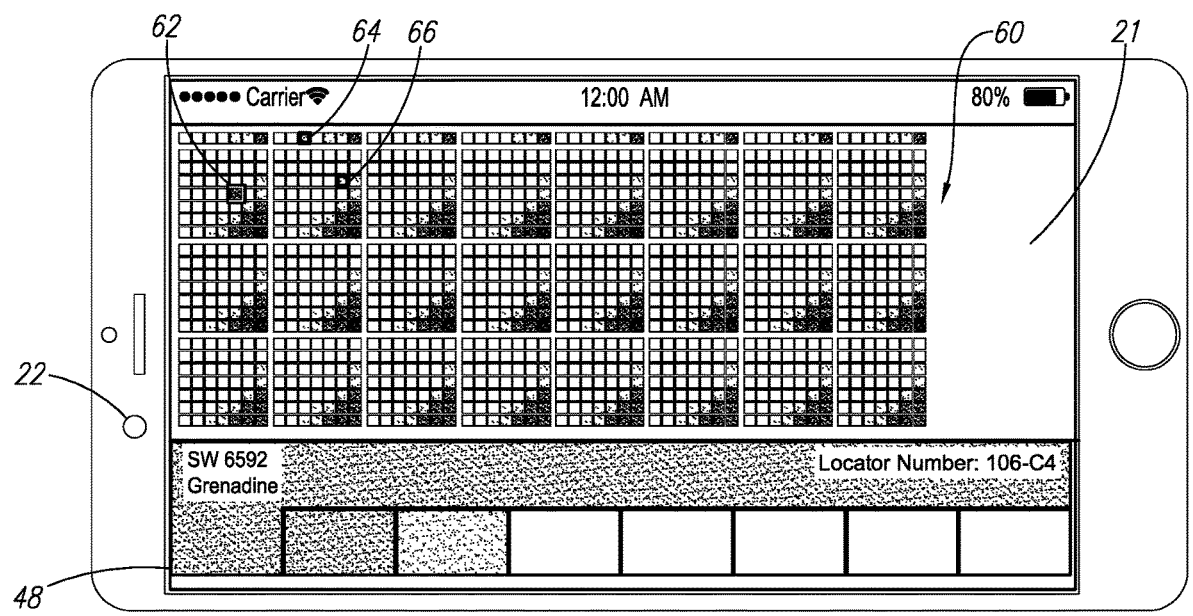
FIG. 6 shows an example mobile communications device.

FIG. 6 shows an example virtual paint chip arrangement 60 with highlighted selected colors 62, 64, 66 from the virtual color palette 48. The virtual color palette 48 includes three selected colors, and the locations of the three colors are highlighted in the virtual paint chip arrangement 60. It can be seen that within the virtual color palette 48, individual selected colors can be chosen for a detailed information display (e.g., color name, color number, locator number, etc.), and the corresponding highlighted selected color 62 in the virtual paint chip arrangement 60 can be highlighted differently from the other highlighted selected colors 64, 66. The color for which detailed information is displayed can be changed by touching different colors within the virtual color palette 48, or by touching another highlighted color in the virtual paint chip arrangement 60. Colors can also be added to the virtual color palette 48 by selection from the virtual paint chip arrangement 60.

The input for initiating the display of the virtual paint chip arrangement 60 can be through a real or virtual button on the smartphone 20. Additionally, or alternatively, the input can be via a physical movement or reorientation (e.g., rotation, shaking, etc.) or other operation or control of the smartphone 20. As discussed above, the smartphone 20 can include orientation sensors for sensing the physical orientation of the smartphone. The processor within the smartphone 20 can receive the orientation signals and cause the virtual paint chip arrangement 60 to be automatically displayed based on the orientation of the smartphone. For example, as shown in FIGS. 4 and 5, when selecting colors for addition to the virtual color palette 48, the smartphone 20 can have a substantially vertical orientation, and the displayed interface screen image can have a portrait orientation. When the smartphone 20 is rotated away from a substantially vertical orientation, e.g., toward a substantially horizontal orientation as shown in FIG. 6, the previous image can be automatically replaced with a new interface screen image having a landscape orientation and showing the virtual paint chip arrangement. Thus, a user can display the physical location of paint chips in the real world retail display simply by rotating the smartphone 20 after the colors are selected. Alternatively, the virtual color array 52 and one or more located colors can be displayed on the display 21 in the vertical orientation as shown in FIG. 4. Alternatively, and depending upon the size and shape of the display of the device, no particular rotation or orientation of the device or smartphone 20 may be required to enable display of the virtual color palette.

Returning to FIG. 5, it can be seen that within or near the virtual color palette 48, additional information and/or selections can be provided for the various selected colors. For example, one or more coordinating colors 68 that coordinate with a selected color can be displayed. A lookup table of coordinating colors for each available color can be stored in the smartphone 20, or the lookup table can be stored remotely and accessed by the smartphone. Coordinating colors can be determined in various ways; for example, coordinating colors could be calculated from the color characteristics (e.g., red, green, and blue levels) of the selected color, determined from past user selections, or determined using other criteria, such as the colors of a school or other institution, the colors of a logo, the colors associated with a sports team, etc. To add a coordinating color to the virtual color palette 48, the coordinating color icon can be touched to activate an entry window for the coordinating colors.

Figure 7:
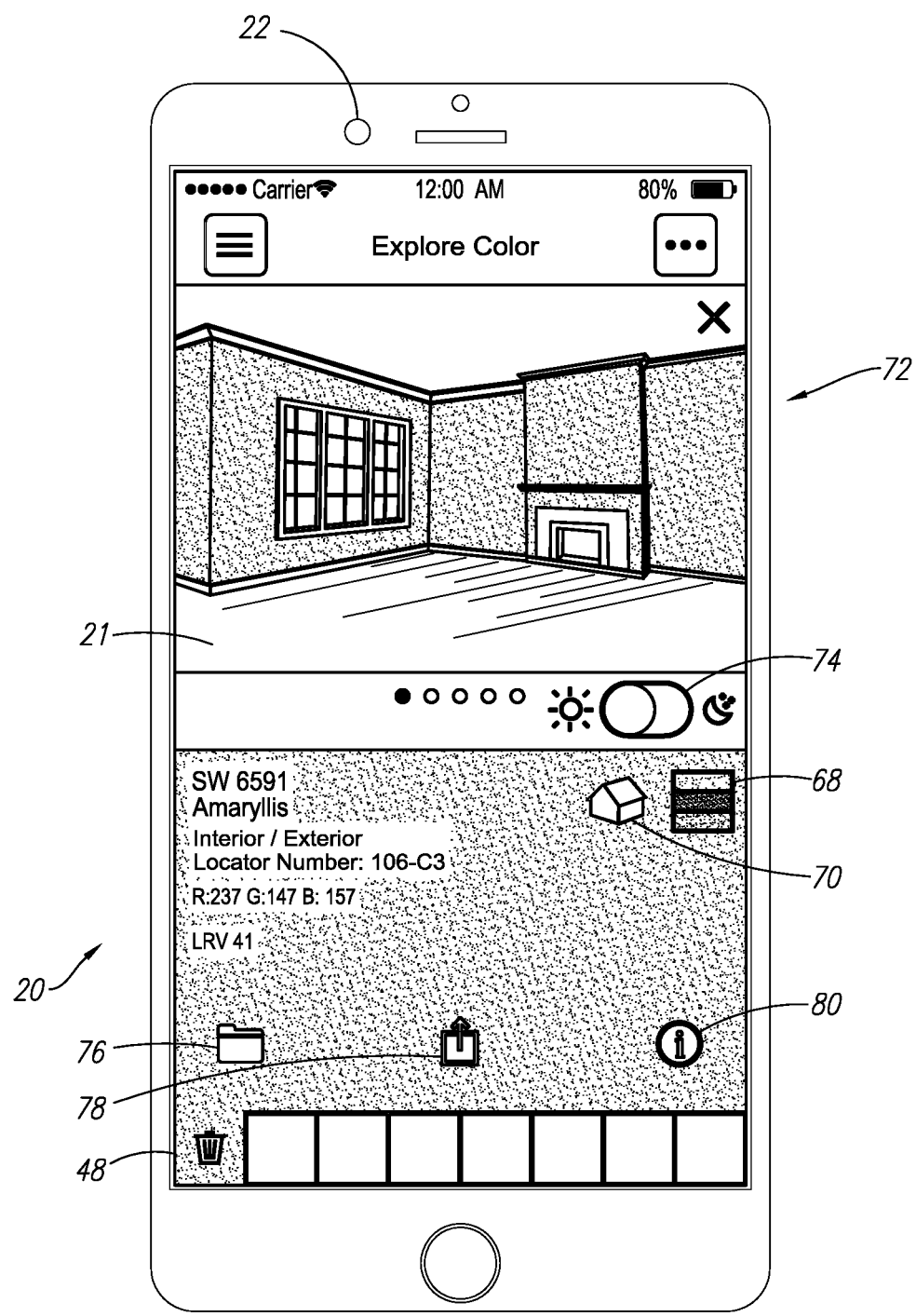
FIG. 7 shows an example mobile communications device.

The color selection application can also allow for the display of a virtual wall painted in a selected color. FIG. 5 includes a structure icon 70 for initiating the display of a virtual wall. When the structure icon 70 is touched, the interface screen having the array 52 of different colors can be replaced with another image showing a virtual wall painted in the selected color. Such an image is shown in FIG. 7. In FIG. 7, an image 72 of an interior room is displayed, and the walls of the room are "painted" in the selected color. Displaying the selected color on a virtual wall can help a user to visualize how the selected color might look in a particular environment. Various different images can be displayed with structural components or objects painted in the selected color. For example, tapping or swiping across the image 72 can activate a different image, such as an image of the exterior of a house or other structure, or a different interior room (e.g., bedroom, bathroom, kitchen, etc.), and portions of the different images, such as walls, cabinets, etc. can be painted in the selected color.

In certain embodiments, the color selection application can allow the lighting of the virtual room or wall to be changed. For example, a daylight/nighttime selector 74 can be provided to change the lighting of the virtual wall from natural sunlight to artificial light, to show the user how a selected color will appear under such different lighting conditions.

Additional information about a selected color is shown in FIG. 7. For example, in addition to the color number and name, an interior/exterior identifier for the selected color is shown. The interior/exterior identifier tells the user whether the selected color is available as interior paint, exterior paint, or both. A locator number is also shown, which can represent the location of the corresponding paint chip for the selected color in the real world retail paint chip display. Red, green and blue (RGB) values for the selected color are also shown, along with a light reflectivity value (LRV) for the color.

Various icons 76, 78, 80 for triggering actions or functions associated with the selected color and/or the virtual color palette 48 can be seen in FIG. 7. A save icon 76 can be provided for saving a selected color and/or virtual color palette 48. Touching the save icon 76 causes the selected color and/or virtual color palette 48 to be saved in the smartphone's memory or in a remote memory accessible by the smartphone. A share icon 78 can be provided for triggering a share action, to share the selected color and/or virtual color palette 48 to a social network or via email for example. A color details icon 80 can be provided for triggering the display of still further information about a selected color. For example, touching the color details icon 80 can trigger the display of additional available colors. The additional available colors can be arranged, with respect to the selected color, according to lightness level, saturation level and/or hue (e.g., HSL values).

Returning to FIG. 3, the initial interface screen includes a scan color number icon 44. Touching the scan color number icon 44 initiates a subprogram in which an image of a code that identifies a color available for purchase can be captured by the smartphone's camera, and the code is read by the color selection application to select the color. The code can be any type of code capable of being recognized by a smartphone, such as an alphanumeric code (e.g., the color number), a conventional or matrix bar code, etc. If the code is a color number or other alphanumeric code, the color selection application can include an optical character recognition (OCR) routine for recognizing the color number. The result of the OCR can be compared to a database of color numbers, stored in the smartphone or remotely, to identify the scanned color number. In certain embodiments, the color name itself can be scanned and recognized to select the color. Scanning the color number and/or name to select a color can be useful because such information is typically printed on the color's paint chip, or a can of paint containing the color, or other documentation concerning paints available for purchase (e.g., a brochure).

After scanned identifying indicia is recognized as corresponding to a color available for purchase, the successful scan can be indicated to the user via displayed textual or graphical information, vibrating the smartphone, playing an audible tone, etc. A color selected by scanning can be automatically added to the virtual color palette, or a prompt can be provided to manually add the selected color to the virtual color palette. A virtual wall painted in the selected color can also be automatically generated and displayed. Upon selecting a color by scanning its identifying indicia, the location of the color's paint chip in the virtual paint chip arrangement can be displayed as described above (e.g., by rotating the smartphone).

Figure 8:
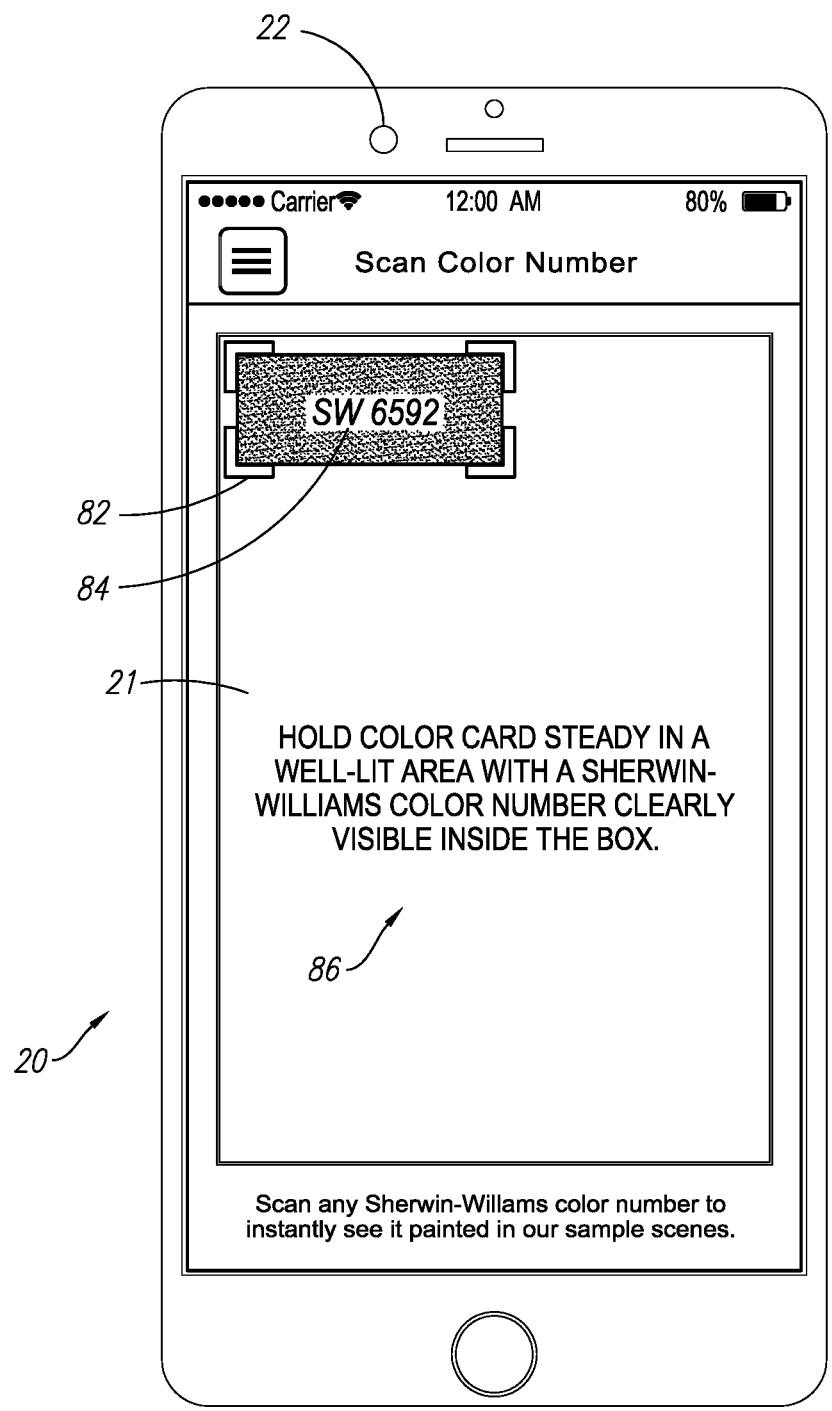
FIG. 8 shows an example mobile communications device.

FIG. 8 shows an example interface screen for capturing a color number or other identifying indicia. The screen can provide a target window 82 for facilitating the proper alignment and sizing of the image of the color number 84. The OCR routine can be performed on the image within the target window 82. The interface screen can also provide instructions 86 to the user as shown. If the OCR is unsuccessful, a text entry box can be displayed to allow the user to manually enter the color number or color name.

Figure 9:
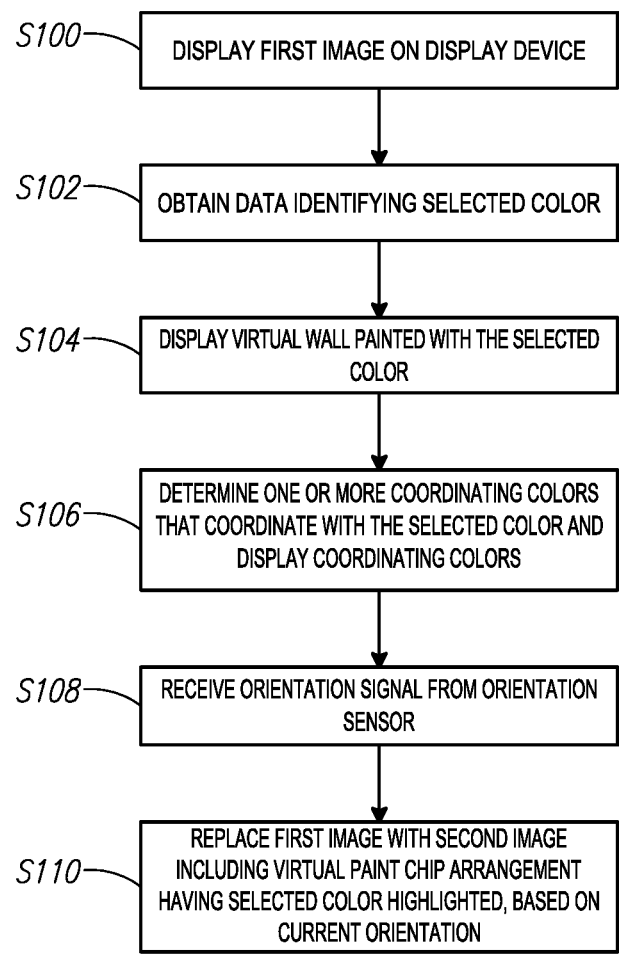
FIG. 9 is a flow diagram.

FIG. 9 is a partial flow diagram of example method steps for selecting and displaying a paint color and other information. The steps in the flow diagram are ordered serially for convenience, and the flow diagram is not intended to convey any particular order for performing the various steps. In step S100, a first image is displayed (e.g., on the touchscreen of a smartphone). Data that identifies a selected color is obtained, e.g., by the processor in the smartphone (step S102). The step of obtaining data that identifies a selected color can include manually selecting the color as discussed above and/or capturing image data that includes the selected color and recognizing the selected color from the captured image (e.g., by an OCR process or by direct color recognition from colors within the captured image).

The displayed first image can include an array of different colors and the selected color can be selected from among the different colors. The first image can also include the virtual color palette showing a plurality of selected colors. Selected colors can be highlighted in the array of different colors as discussed above, and colors adjacent to the selected colors can also be highlighted. The colors can be highlighted by increasing the respective sizes of color icons in the array (see FIG. 5). After a color is selected, a virtual wall painted in the selected color can be displayed (step S104). Further, coordinating colors that coordinate with the selected color can be determined (e.g., by the processor in the smartphone) and displayed (step S106). The processor can receive an orientation signal from an orientation sensor in the smartphone (step S108). Based on a current orientation of the smartphone, the first image can be automatically replaced with a second image that includes a virtual paint chip arrangement corresponding to a real world retail paint chip display, and the selected color can be highlighted in the virtual paint chip arrangement (step S110). Rotation of the smartphone from a first orientation (e.g., substantially vertical) to a second orientation (e.g., substantially horizontal) can be determined, and the first image can be automatically replaced with the second image when the smartphone is so rotated. The first image can have a portrait orientation and the second image can have a landscape orientation.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A device for color selection and display, comprising:
a display;
a user interface that receives input data identifying a selected color;
an orientation sensor that generates an orientation signal based on an orientation of the device;
a memory storing a virtual paint chip arrangement, wherein each individual color within the virtual paint chip arrangement corresponds to a color of a physical paint chip of a paint chip display in a retail store and a relative location of each individual color within the virtual paint chip arrangement matches a relative location of the corresponding physical paint chip in the paint chip display; and at least one processor that receives the orientation signal and determines an orientation of the device, and controls the display to automatically display the virtual paint chip arrangement based on the orientation of the device, wherein the selected color is highlighted in the virtual paint chip arrangement, such that an on-screen location of the selected color matches the relative location of a physical paint chip in the paint chip display that corresponds to the selected color.

2. The device of claim 1, wherein:

in a first orientation of the device, the display displays a plurality of different colors, and the user interface receives the input data identifying the selected color from among the plurality of different colors, and in a second orientation of the device, the display displays the virtual paint chip arrangement with the selected color highlighted.

3. The device of claim 2, wherein:

the display and user interface are part of a touchscreen interface, in the first orientation of the device, the display displays the plurality of different colors along with a virtual color palette showing a plurality of selected colors, and in the second orientation of the device, the display displays both of the virtual color palette showing the plurality of selected colors, and the virtual paint chip arrangement with the plurality of selected colors highlighted.

4. The device of claim 2, wherein, in the first orientation of the device, the selected color and colors immediately adjacent to the selected color in the displayed plurality of different colors are highlighted within the displayed plurality of different colors.

5. The device of claim 2, wherein the device is a handheld mobile communications device, and the first orientation is a substantially vertical orientation of the mobile communications device, and the second orientation is a rotated orientation of the handheld mobile communications device with respect to the first orientation.

6. The device of claim 1, further comprising a camera for capturing an image, wherein the processor performs an optical character recognition (OCR) on the image and determine the selected color from a result of the OCR.

7. The device of claim 1, wherein:

the selected color is one of a plurality of selected colors, in a first orientation of device, the display displays a virtual color palette showing the plurality of selected colors, and in a second orientation of device, the display displays the virtual paint chip arrangement with the selected colors highlighted.

8. The device of claim 1, wherein:

in a first orientation of the device, the display displays a virtual wall painted with the selected color, and in a second orientation of the device, the display displays the virtual paint chip arrangement with the of selected color highlighted.

9. The device of claim 8, wherein the processor determines a plurality of coordinating colors that coordinate with the selected color, and in the first orientation of the device, the display automatically displays the coordinating colors in addition to the selected color.

10. A color selection and display method, comprising:

displaying, on a display of a handheld data processing device, a first image;

obtaining, by at least one processor of the handheld data processing device, data identifying a selected color;

receiving, by the at least one processor, an orientation signal from an orientation sensor within the handheld data processing device; and based on a current orientation of the handheld data processing device, automatically replacing the first image with a second image that includes a virtual paint chip arrangement, each individual color within the virtual paint chip arrangement corresponding to a color of a physical paint chip of a physical paint chip display in a retail store, and a relative location of each individual color within the virtual paint chip arrangement matching a relative location of the corresponding physical paint ship in the paint chip display, such that an on-screen location of the selected color matches the relative location of a physical paint chip in the paint chip display that corresponds to the selected color, wherein the selected color is highlighted in the virtual paint chip arrangement.

11. The color selection and display method of claim 10, wherein the display is part of a touchscreen interface, and the first image includes a plurality of different colors, and the selected color is selected from among the plurality of different colors, the method further comprising determining rotation of the handheld data processing device from a first orientation to a second orientation, wherein the first image is automatically replaced with the second image when the handheld data processing device is rotated from the first orientation to the second orientation.

12. The color selection and display method of claim 11, wherein the first image includes a virtual color palette showing a plurality of selected colors, and the second image includes both of the virtual color palette showing the plurality of selected colors and the virtual paint chip arrangement with the plurality of selected colors highlighted.

13. The color selection and display device of claim 11, wherein displaying the first image includes highlighting the selected color and colors immediately adjacent to the selected color within the plurality of different colors by increasing respective sizes of color icons corresponding to the selected color and colors immediately adjacent to the selected color relative to other color icons in the displayed plurality of different colors.

14. The color selection and display device of claim 11, wherein the handheld data processing device is a mobile communications device, the first orientation is a substantially vertical orientation of the mobile communications device, the second orientation is a rotated orientation of the mobile communications device with respect to the first orientation, the first image has a portrait orientation, and the second image has a landscape orientation.

15. The color selection and display method of claim 10, further comprising:

capturing image data; and recognizing, by the at least one processor of the handheld processing device, a character string in the image data to obtain the data identifying the selected color.

16. The color selection and display method of claim 10, wherein the first image has a portrait orientation and includes a virtual color palette showing a plurality of selected colors, and the second image has a landscape orientation and the plurality of selected colors are highlighted in the virtual paint chip arrangement.

17. The color selection and display method of claim 10, further comprising displaying a virtual wall painted with the selected color.

18. The color selection and display method of claim 10, further comprising:
 determining, by the at least one processor of the handheld data processing device, a plurality of coordinating colors that coordinate with the selected color; and
 displaying the coordinating colors with the selected color.

19. A computer program product for displaying a location of a selected color within a virtual paint chip arrangement, each individual color within the virtual paint chip arrangement corresponding to a color of a physical paint chip of a paint chip display in a retail store, a relative location of each individual color within the paint virtual paint chip arrangement matching a relative location of the corresponding physical paint chip in the paint chip display, the computer program product comprising a plurality of instructions stored on a non-transitory computer-readable storage medium, the instructions being executable by a processor in a device to allow the device to:
 display a first image;
 obtain data identifying a selected color;
 receive an input from a user; and
 replace the first image with a second image that includes the virtual paint chip arrangement based on the input from the user, wherein the selected color is highlighted in the virtual paint chip arrangement such that an on-screen location of the selected color matches the relative location of a physical paint chip in the paint chip display that corresponds to the selected color.

20. The computer program product of claim 19, wherein the input from the user comprises movement of the device, and the instructions further allow the device to determine a physical orientation of the device and automatically replace the first image with the second image that includes the virtual paint chip arrangement based on the physical orientation of the device.

21. The computer program product of claim 20, wherein the first image includes a virtual color palette showing a plurality of selected colors, and the first image has a portrait orientation and second image has a landscape orientation, and the second image replaces the first image when the device is rotated away from a substantially vertical orientation.

22. A color selection and display device, comprising:
 a display;
 a user interface that receives input data identifying a selected color;
 a memory storing a virtual paint chip arrangement, wherein each individual color within the virtual paint chip arrangement corresponds to a color of a physical paint chip of a paint chip display in a retail store and a relative location of each individual color within the virtual paint chip arrangement matches a relative location of the corresponding physical paint chip in the paint chip display; and
 at least one processor that controls the display to display the virtual paint chip arrangement such that the selected color is highlighted in the virtual paint chip arrangement and an on-screen location of the selected color matches the relative location of a physical paint chip in the paint chip display that corresponds to the selected color.

23. The color selection and display device of claim 22, where the selected color is one of a plurality of selected colors, and the display displays, with the virtual paint chip arrangement, a virtual color palette showing the plurality of selected colors.

24. The color selection and display device of claim 22, wherein the at least one processor controls the display to display a first image including a virtual wall painted with the selected color, and a second image including the virtual paint chip arrangement with the selected color highlighted.

25. The color selection and display device of claim 22, wherein the at least one processor is controls the display to display a first image including a plurality of different colors and the selected color, and a second image including the virtual paint chip arrangement with the selected color highlighted, and wherein:
 in the first image, the selected color and colors immediately adjacent to the selected color in the plurality of different colors are highlighted within the displayed plurality of different colors.

26. The color selection and display device of claim 25, wherein sizes of color icons corresponding to the selected color and colors immediately adjacent to the selected color in the first image are larger than sizes of other color icons in the displayed plurality of different colors.

* * * * *